United States Patent [19]
Tonder et al.

[11] Patent Number: 5,906,669
[45] Date of Patent: May 25, 1999

[54] MAN-MADE VITREOUS FIBER PRODUCTS AND PROCESSES AND APPARATUS FOR THEIR PRODUCTION

[75] Inventors: Flemming Weiss Tonder, Jyderup; Poul Holst Jespersen, Hvalso, both of Denmark

[73] Assignee: Rockwool International A/S, Denmark

[21] Appl. No.: 08/952,404

[22] PCT Filed: May 14, 1996

[86] PCT No.: PCT/EP96/02068

§ 371 Date: Jan. 23, 1998

§ 102(e) Date: Jan. 23, 1998

[87] PCT Pub. No.: WO96/38391

PCT Pub. Date: Dec. 5, 1996

[30] Foreign Application Priority Data

May 15, 1995 [GB] United Kingdom .................... 9509782

[51] Int. Cl.[6] ............................. C03B 37/05; D04H 3/03; D04H 3/16
[52] U.S. Cl. ................................ 65/455; 65/456; 65/516; 65/517
[58] Field of Search ................................ 264/6, 8; 425/8; 65/455, 456, 516, 517

[56] References Cited

U.S. PATENT DOCUMENTS

| | | |
|---|---|---|
| 3,045,279 | 7/1962 | Hesse . |
| 3,709,670 | 1/1973 | Eriksen . |
| 4,119,421 | 10/1978 | Alenrot et al. . |
| 5,051,123 | 9/1991 | Nurmi . |
| 5,131,935 | 7/1992 | Debouzie et al. . |
| 5,468,274 | 11/1995 | Grove-Rasmussen ..................... 65/455 |

FOREIGN PATENT DOCUMENTS

| | | |
|---|---|---|
| 2356606 | 1/1978 | France . |
| 8810242 | 12/1988 | WIPO . |

*Primary Examiner*—Mary Lynn Theisen
*Attorney, Agent, or Firm*—Ostrolenk, Faber, Gerb & Soffen, LLP

[57] ABSTRACT

The invention relates to an arrangement for cleaning a wool chamber in the manufacture of mineral wool. In the manufacture of mineral wool a binder is added to the stream of fibers which is deflected towards the wool chamber and the binder deposits itself in fine droplets in the fibers. The binder-laden fibers which touch against the walls and roof of the wool chamber adhere to them because the binder hardens upon contact with the hot surfaces. Gradually a hard deposit of binder and fibers is formed upon the walls. According to the invention cleaning of the walls is substantially simplified by means of making the walls and/or roof of a double walled construction, perforating the inner walls and applying a reduced pressure in the cavity between the walls holding a detachable lining against the inner walls by means of suction. When the lining has become coated with deposits of binder and fibers to a certain thickness production is halted and the reduced pressure is broken off whereon the detachable lining together with the deposits falls off and a new detachable lining is applied.

41 Claims, 4 Drawing Sheets

MAN-MADE VITREOUS FIBER PRODUCTS AND PROCESSES AND APPARATUS FOR THEIR PRODUCTION

This invention relates to apparatus and processes for making man-made vitreous fibre (MMVF) products by a centrifugal spinner technique in which the or each rotor is mounted to rotate about a substantially horizontal axis. It also relates to products having particularly useful combinations of properties and which can be made by the centrifugal spinner technique.

The centrifugal spinner can have a single rotor mounted for rotation on a substantially horizontal axis, for instance as in the system known as the Downey spinner. More usually the centrifugal spinner is a cascade spinner comprising a first rotor and one or more subsequent rotors each mounted for rotation about a substantially horizontal axis and arranged such that melt poured on to the first rotor is thrown on to the or each subsequent rotor in turn and is thrown centrifugally off the or each subsequent rotor and optionally off the first rotor as fibres.

It is necessary to carry the fibres away from the rotors. In U.S. Pat. No. 3,709,670 a cascade spinner discharges into a collection chamber which is closely coupled to the spinner. In this instance the fibres are not collected as a web but are merely sucked out of the chamber as fibres entrained in air.

In most processes the fibres are carried towards and onto a collector where they form a web, which is then carried away from the spinner by the collector. The web may be laminated on itself. It is important to deposit the fibres on the collector in as laminar a fashion as possible. If fibres are deposited perpendicular to the plane of the web, for instance as clusters or balls of fibres, this tends to detract from the properties of the web and products made from it.

It is conventional to provide air flowing axially forward around the spinner so as to carry fibres from adjacent the rotor towards and onto the collector. This transport air can be blasted out of transport air supply orifices positioned around and a few centimeters from the periphery of the rotors as described in GB 867299 or it can be sucked around the spinner by suction applied through the collector, as described in GB 961900, or both by blast and by suction.

The collector is usually the inclined base of a collection chamber. Usually the chamber is open in the spinner end of the chamber, i.e., distant from the collector, and the spinner is positioned in this open end leaving a relatively large and variable open area around the spinner for the entry of induced air which is sucked into the chamber. The spinner with its associated motors for driving the rotors usually has a bulky cross-sectional area, for instance as shown in FIG. 1 of U.S. Pat. No. 5,131,935. Although the spinner may present a substantially rectangular profile as shown in that, often it presents a very irregular profile both in transverse and longitudinal cross-section. Accordingly the cross-section of the open area around the spinner is highly variable with sudden changes in open area along the length of the spinner. Air flow along the length of the spinner is liable to be highly turbulent due to its variable longitudinal profile. Additionally it is necessary to provide sufficiently powerful suction through the collector to suck air in through the open area around the spinner with sufficient axial velocity to carry the fibres onto the collector.

In GB 961900 the spinner end of the collecting chamber is substantially closed except for an opening in which the spinner is located. A tubular duct leads to this opening and the rotors of the spinner are mounted within a spinner housing in this tubular duct, so as to define a relatively narrow passage, which is described as a nozzle, between the spinner housing and the outer tubular wall of the duct. Air is sucked through this narrow passage as a result of suction through the collector, so as to carry fibres away from the spinner rotors and on to the collector. The air flow through the duct is said to be at 1,000 to 5,000 feet per minute (about 5 to about 30 m/s) and it is stated that the passages which conduct the air to the rotors are designed to avoid or to eliminate eddy currents or other turbulence within the fluid stream.

Accordingly it seems to be intended that substantially steady flow conditions should prevail in the passage leading up to the rear of the rotors. However these steady flow conditions will inevitably be destroyed as the air emerges from the passage past the rotors because of the very large area occupied by the front of the spinner housing (through which no air is emerging) relative to the open area of the passage. The quantitative relationship between the open area and the area of the end of the housing is not capable of determination from the drawings of GB 961,900 because of inconsistencies in the drawings. However the passage does not even extend around the entire spinner housing and is instead merely C-shaped with a large area above the spinner blocked off. It is therefore inevitable that even if a boundary layer is attached to the spinner housing and the outer tubular wall of the duct as the passage leads up to the rotors, wholly turbulent conditions will prevail as the air emerges from this passage. This turbulence will be further promoted by the fact that the air emerges from a passage which is narrow into a wide spinning chamberdefined at its rear by a wide partition wall. There will therefore be a very significant amount of back eddys being formed in the chamber both within the area of the front end of the spinner and outside the area of the passage. Back flow of air within the chamber is shown in the drawings, and it is also shown that the air is considered to be drawn substantially perpendicular through the collector. It is therefore inevitable that a considerable amount of formation of tufts or balls of fibres will occur.

When forming MMVF products by a centrifugal spinner, it is known to improve initial fibre formation and transport of fibres away from the rotor surface by providing primary air supply means associated with each of the subsequent rotors (and optionally also with the first rotor) for blasting air substantially axially forwards across the surfaces of the rotors. Thus this air blast travels substantially axially along the surface of the rotors. It may also have a helical or tangential component, and may adopt the form of a diverging cone. Such a system is described in, for instance, WO 92/06047 and in U.S. Pat. No. 5,131,935. This air blast will normally have very high velocity, typically above 100 meters per second (20,000 feet per minute).

The air that is blasted along the surface of the rotors emerges with substantially steady flow conditions across the surface of the rotors so as to attach to the rotors as a boundary layer which is a wall jet, so as to promote fibre formation.

Despite the steady flow conditions leading up to the rotors, normal commercial practice results in very turbulent conditions prevailing immediately in front of the rotors. For instance when steady flow conditions prevail in the primary air, very turbulent conditions usually prevail in any air that is flowing around the spinner. For instance in U.S. Pat. No. 5,131,935 a typical arrangement is shown in which the spinner is bulky and of irregular shape and has motors offset from the rotors. Accordingly any air flowing along the spinner is unlikely to have a boundary layer attached to the spinner and the large area of the front end of the spinner also co-operates to ensure significant turbulence immediately in front of the spinner. Accordingly, even if any induced air flowing along the spinner had steady flow conditions as it approached the rotors, the primary air has such a high axial velocity relative to the axial velocity of the induced air that there is a very high velocity gradient in the radial direction. This gradient, and the spacing between the primary air and the induced air, in practice is so large that significant turbulence and back eddys inevitably occur immediately in front of the front end of the spinner. In practice, as mentioned above, the air flowing along the spinner towards the rotors is liable to be turbulent in contrast to being under steady flow conditions and this will further increase turbulence. Turbulence immediately in front of the spinner will also be increased by the fact that, in practice, the area occupied by the rotors is normally a relatively small proportion (e.g., below 25%) of the area of the front end of the spinner. All these factors combine to result in a substantial degree of turbulence where the primary air merges with the air which has flowed along the spinner. The air flow immediately in front of the spinner is therefore inherently turbulent and not under steady flow conditions. Accordingly, it is inevitable that a significant proportion of the fibres will be formed into tufts or otherwise deposited on the collector in the thickness direction of the collector.

In conventional centrifugal spinner apparatus, air which is sucked in around the spinner necessarily has a much lower velocity, generally less than 5% of the velocity of the primary air. This is essential because the volume of air that has to be transported towards and through the collector would be excessive, with present designs of apparatus, if the velocity is higher than this, especially having regard to the variable and generally large open area around some parts at least of the spinner in conventional apparatus.

In practice therefore conventional centrifugal spinners provided with a primary air supply, as described above, necessarily generate a very high central primary air velocity and a relatively low induced air velocity around it but spaced away from it. In WO 88/06146 a unit is shown which comprises a single rotor mounted in a relatively streamlined housing that contains both the rotor and a motor coaxial with the rotor for driving the motor, but no details are given about how such a unit should be utilised in practice to form fibres, or about the relationship between air that is forced internally of the housing and any air that may flow around the housing.

In WO 93/13025 a cascade spinner discharges towards a steeply inclined collector surface and a primary air blast and a plurality of other air blasts are provided through and around the spinner. Suction is applied from behind the collector so that there is no pressure drop across the collector and the collection chamber is described as being essentially wall-less. Thus it seems that sufficient air blasts are provided that the collection area can be entirely open to the atmosphere, the fibres being confined solely by the movement of air. This has the advantage that potential fouling of the chamber walls is avoided but it makes it very difficult to control the process in practice.

MMVF wool made using a horizontally mounted centrifugal spinner, and in particular a cascade spinner, is generally formed from stone melt (otherwise known as rock or slag melt) in contrast to glass wool which is usually made from a glass melt by, for instance, a Tel spinner. Stone wool made by such spinners has several advantages over glass wool. The stone wool has better fire resistance and water repellancy, and production costs can be lower, for instance due to reduced raw material costs. In order to obtain equivalent insulation value it is, however, generally necessary to make the stone wool with a higher density than glass wool. For instance MMVF wool from a cascade spinner tends to contain a proportion of shot (particles having a diameter of at least 63 $\mu$m) and this tends to be inert as regards the properties of the wool.

It is possible to reduce the amount of shot and to improve the properties of MMVF wool made by a cascade or other horizontally mounted centrifugal spinner by operating the spinner under carefully controlled conditions, and in particular by reducing the throughput of the spinner. However this tends to increase production costs. An example of MMVF wool which can be made by a cascade spinner and which can have good qualities, but which is generally made at rather low throughput per unit hour, is described in WO92/12941.

It would be desirable to be able to improve the production of MMVF wool by such a spinner so as to allow improvement in the productivity of the process or the product quality or both. In particular, it would be desirable to modify existing processes and apparatus so as to allow improved control and operation of the process and so as to allow improved lay-down of the fibres in the web which is produced in the process, at convenient rates of production.

The invention provides a novel apparatus comprising a horizontally mounted centrifugal spinner and a collecting chamber, novel components for use in that apparatus including a novel spinner and assembly of spinner with a surrounding housing, and a novel process for making MMVF products using the novel spinner and/or novel apparatus.

By the invention it is possible to produce high quality MMVF products in an economic manner, and these products include new products.

In the apparatus embodiment of the first aspect of the invention, novel apparatus for making MMVF (especially stone) products comprises a centrifugal spinner having a front end, a first rotatable rotor or a set of rotatable rotors consisting of a first rotor and one or more subsequent rotors, wherein the or each rotor is mounted for rotation about a substantially horizontal axis in front of the front end whereby melt poured onto the first rotor is thrown off as fibres or, in a set of rotors, is thrown onto the or each subsequent rotor in sequence and is thrown off the or each subsequent rotor and optionally off the first rotor as fibres, and primary air supply means at least in the outer peripheral regions of the spinner associated with the first rotor or, in the set of rotors, with each subsequent rotor and optionally with the first rotor for blasting primary air substantially axially forwards across the surface of the or each rotor with which the primary air supply means are associated, and motor means for rotating the or each rotor, a chamber which comprises a collecting portion which has a spinner end adjacent to the cascade spinner and which extends forwards from the spinner end and which comprises side and top walls and an upwardly inclined base defined by a collector mounted to receive fibres blown from the spinner and to carry the fibres as a web out of the chamber, and suction means for applying suction through the collector, and in this apparatus the chamber also comprises a spinner portion which has a rear end which is open to the atmosphere and a front end which opens into and merges with the collecting portion, and a substantially tubular duct which extends between the front end and the rear end, the collecting portion of the chamber is substantially closed to the ingress of air except for air forced through the spinner and air which is sucked through the tubular duct and, optionally, a lesser, non-interfering, amount of air sucked or forced through supplementary air passages in the spinner end of the collection portion, the front end of the spinner and the front end of the spinner portion together define a substantially open annular collar between them, at least 50% of the cross-sectional area of the front end of the spinner portion is open to the flow of air sucked through the spinner portion by the suction means, and the spinner and the tubular duct are constructed to provide substantially steady air flow conditions through the collar.

As a result of providing the induced air under steady flow conditions through the collar, coupled with appropriate choice of the forced or primary air, it is easily possible to provide substantially non-turbulent conditions in the region in the collecting portion where the primary air initially merges with the air from the collar.

The process first aspect of the invention utilises apparatus comprising a centrifugal spinner having a front end, a first rotatable rotor or a set of rotatable rotors consisting of a first rotor and one or more subsequent rotors, wherein the or each rotor is mounted for rotation about a substantially horizontal axis in front of the front end whereby melt poured onto the first rotor is thrown off as fibres or, in a set of rotors, is thrown onto the or each subsequent rotor in sequence and is thrown off the or each subsequent rotor and optionally off the first rotor as fibres, and primary air supply means at least in the outer peripheral regions of the spinner associated with the first rotor or, in the set of rotors, with each subsequent rotor and optionally with the first rotor for blasting primary air substantially axially forwards across the surface of the or each rotor with which the primary air supply means are associated, and motor means for rotating the or each rotor, a chamber which comprises a collecting portion which has a spinner end adjacent to the centrifugal spinner and which extends forwards from the spinner end and which comprises side and top walls and an upwardly inclined base defined by a collector mounted to receive fibres blown from the spinner and to carry the fibres as a web out of the chamber, and suction means for applying suction through the collector, and in this apparatus the chamber also comprises a spinner portion which has a rear end which is open to the atmosphere and a front end which opens into and merges with the collecting portion, and a substantially tubular duct which extends between the front end and the rear end, the collecting portion of the chamber is substantially closed to the ingress of air except for air forced through the spinner and sucked through the tubular duct and, optionally, a lesser, non-interfering, amount of air sucked or forced through supplementary air passages in the spinner end of the collection portion, the front end of the spinner and the front end of the spinner portion together define a substantially open annular collar between them, at least 50% of the cross-sectional area of the front end of the spinner portion is open to the flow of air sucked through the spinner portion by the suction means, and the spinner and the tubular duct are constructed to provide substantially steady flow conditions through the collar, and the process comprises pouring melt onto the first rotor while the rotor or rotors are spinning, forming fibres off the first rotor or, in a set of rotors, off the or each subsequent rotor and optionally the first rotor while forcing primary air through the primary air supply means under substantially steady flow conditions, and collecting the fibres as a web on the collector while applying suction through the collector and carrying the web out of the chamber on the collector, and in this process the air sucked through the collar flows through the collar under substantially steady flow conditions with an axial velocity which is 5 to 40% of the axial velocity of the primary air as it is forced out of the air supply means.

Throughout this specification, unless otherwise stated, axial velocities are calculated on the basis of the rate of flow ($Nm^3$ per second) through the area of the passage through which the air is flowing. Thus the axial velocity of the primary air is calculated on the basis of the open area of the slots and the axial velocity of the air sucked through the open area in the front end of the spinner portion is calculated on the basis of the area of the collar or, if there is an open area within the spinner, on the area of the collar plus the open area within the spinner.

As a result of flowing the air through the collar under substantially steady flow conditions and as a result of selecting the axial velocity of the air which flows through the collar appropriately within the range of 5 to 40% of the axial velocity of the primary air, it is possible to provide essentially non-turbulent conditions in the collecting chamber where the primary air initially merges with the air from the collar. This is facilitated by arranging for the primary air and the air from the collar to emerge from the spinner as close together as is conveniently possible.

The spinner used in the apparatus and process aspects of the invention can comprise a single rotor but preferably has a plurality of rotors (as a cascade spinner).

The cascade spinner can have an open outer periphery in which event it does not have a housing enclosing the spinner. Instead, the cascade spinner may comprise, for instance, a plurality of individual units each of which may comprise a single rotor mounted in a relatively streamline housing that contains both the rotor and a motor co-axial with the rotor for driving the motor, for instance as illustrated in WO88/06146. For instance one such unit may provide the top rotor and one, two or three such units may provide the subsequent rotors, and each of the units may be mounted independently on an outer tubular duct. More usually, however, the rotor units are inter-connected as an assembly, by rods or other supports which allow the passage of air between the rotor units as well as between the assembly of rotor units and the surrounding tubular duct.

Preferably, however, the spinner which is used in the apparatus and process aspects of the invention has a housing which is substantially closed to the free axial flow of air, for instance due to being closed at its front or rear ends and the rotors are mounted on means (such as shafts) within or substantially behind this housing for rotation in front of the housing.

Accordingly, the preferred spinner comprises a housing which is substantially closed to the free axial flow of air through the spinner and which has a front face, a rear end and a substantially tubular housing wall which extends between the front face and the rear end and which is substantially streamlined to air flowing axially along the front end of the outside of the housing, a first rotor and one or more subsequent rotors each mounted in the housing for rotation in front of the front face about a substantially horizontal axis and arranged such that melt poured onto the first rotor is thrown onto the or each each subsequent rotor in turn and is thrown off the or each subsequent rotor (and optionally off the first rotor) as fibres, and primary air supply means associated with the subsequent rotor or with each of the subsequent rotors (and optionally with the first rotor) for blasting air axially forward across the surfaces of the or each rotor at least in the outwardly facing regions of the or each rotor, and motor means for driving the rotors and located within the housing or substantially behind the rear end, i.e., with the motors all being arranged so that their periphery is substantially within the area defined by the periphery of the rear end of the housing, when viewed from the rear.

In a typical conventional cascade spinner, such as is illustrated in WO92/12941 or WO92/06047 or U.S. Pat. No. 5,131,935, the rotors typically occupy only a very small proportion (for instance 5 to 20%) of the total cross-sectional area of the cascade spinner. Accordingly the parts of the spinner housing around the rotors necessarily provides the opportunity for undesired turbulence and eddy formation. In the invention, the total cross-sectional area of the rotors is preferably at least 40% of the maximum cross-sectional area of the cascade spinner.

When the spinner is an open assembly of individual rotor units, then the cross-sectional area of the spinner is the area that partially blocks the axial flow of air past the spinner, i.e., the total cross-sectional solid area of the spinner. When as is preferred the cascade spinner has a substantially closed outer housing defined by a substantially tubular wall then the maximum cross-sectional area is the maximum area defined by this closed housing except that if there is a central open duct through the spinner, to allow induced air to flow through the spinner as described in U.S. Pat. No. 5,131,935, the area of this open duct is excluded from the area of the spinner.

The second aspect of the invention provides a novel spinner as described above having a housing which is substantially closed to the free axial flow of air through the spinner and in which the total cross-sectional area of the first and subsequent rotors is at least 40%, usually 40 to 95%, of the maximum cross-sectional area defined by the housing.

The novel spinner may be mounted in a substantially tubular duct that surrounds the housing and which is open at each end to define an annular passage between the spinner housing and the duct, as explained below.

The front face of the spinner housing and/or the rear end are preferably closed in order that the housing is substantially closed to the free axial flow of air through the spinner. Appropriate air supply means and apertures for the axles and orifices for the supply of binder may be provided in a solid front face of the housing. Preferably both the front and rear of the housing are closed.

The substantially tubular housing wall which encloses the spinner is substantially streamlined at least along the front end of the wall and preferably along the entire length of the wall. The extent of streamlining should be such that the air flowing along the wall has a boundary layer which is attached to the wall at least along the front end of the wall (for instance at least the front 25% of the length of the housing) so as to allow substantially steady flow conditions along the front end of the wall, and preferably along the entire length of the housing.

In order that the boundary layer remains substantially attached, the wall is preferably substantially free of flow-distorting steps having a radial depth of more than about 5 cm or 10 cm at most, and preferably they are substantially free of such steps having a radial depth of more than about 1 or 2 cm. A step can be considered to be flow-distorting if the step has a substantial radial depth (for instance a depth greater than 2 cm or 5 cm at the most) and which has a face, and especially a downstream face (i.e., the face which faces towards the collecting chamber) which has a significant radial depth and makes an angle of more than about 30° to the axis. The angle of any such face which is present should therefore be not more than 30° and is preferably less than 20°, most preferably less than 10°, to the axis (i.e., the downstream face should make an angle of at least 150°, and preferably approaching 180° with the downstream surface of the housing).

The upstream face (i.e., the face which faces towards the rear end of the spinner) preferably makes an angle of not more than about 45° to the axis (i.e., the upstream face and the upstream surface of the housing makes an angle of more than 135°), and preferably the angle is less than 30° and is preferably less than 15°.

The total cross-sectional area of the rotors is preferably as large as possible with respect to the maximum cross-sectional area of the spinner housing, and is preferably at least 50%, and most preferably at least 55% of the area. It can be up to 85% or 90%, but it is often adequate that it is up to, say, 70 or 75% of the maximum area. For instance the spinner cross sectional area typically is 0.3 to 0.6 m$^2$ and the rotor area is 0.15 to 0.4 m$^2$.

The rotors can be slightly conical or domed, but preferably are substantially cylindrical.

The spinner may contain solely the first rotor and one, or more usually two, subsequent rotors, but preferably there are three subsequent rotors.

The first rotor generally has a diameter in the range 100 to 250 mm, often around 150 to 200 mm. Each subsequent rotor generally has a diameter in the range 150 to 400 mm, often around 220 to 350 mm. Typically the first rotor has a diameter in the range 220 to 300 mm and the subsequent rotors have a diameter in the range 300 to 350 mm.

The rates of revolution of the rotors are generally such that the first rotor has an acceleration field of 8 to 100 km/sec$^2$ while the subsequent rotors provide an acceleration field which is normally at least as much as the field on the first rotor and is often at least 1.5 times the acceleration field on the first rotor, and is generally in the range 20 to 300 km/sec$^2$. For instance when relatively coarse fibres are required the acceleration field on the first rotor is typically in the range 8 to 25 km/sec$^2$ while the acceleration field on each of the subsequent rotors is higher and is typically in the range 15 to 70 km/sec$^2$. However when finer fibres are required, the acceleration field on the first rotor is typically in the range 30 to 100 km/sec$^2$ and the field on the subsequent rotors is typically higher and is in the range 80 to 350 km/sec$^2$.

The front part of the spinner housing can be streamlined by being tapered inwardly towards the base of rotors in the front face, for instance at an angle of up to 45°, preferably at an angle of not more than about 20 or 30°. This tapering can be over a relatively short distance, for instance up to 5 cm or perhaps 10 cm. The defined percentages of the area of the housing can then apply to the front portion only of the housing, for instance the first 5 or 10 cm of the housing. In particular, preferably the rotors have an area of at least 50% of the cross-sectional area defined by the front 10 cm of the housing. Any wider part of the housing behind this front part may have little or no effect on the potential for turbulence around the front face if the housing is shaped appropriately. However if desired the tapering can be over a longer distance.

Generally, however, the housing has substantially parallel sides leading from adjacent the front face (e.g., within 5 cm) to its extreme rear end or to a position near its rear end sufficiently far from the front face to avoid having significant turbulence-inducing consequences on the air flowing around the front end. For instance steps or other shapes due to supply pipes or motors in the rear 25%, and usually in the rear 10%, of the total length of the cascade spinner are usually acceptable. Further, as explained below, if any outer tubular duct is shaped appropriately it can be suitable for the streamlined part of the housing to extend only along a minor part of the total length of the spinner.

It is also possible for the substantially parallel sides to merge into an inwardly tapered rear section, so that the diameter of the housing expands gradually outwards from the rear end towards the front end of the spinner housing. Thus particularly effective streamlining can be achieved by having the housing tapering rearwards towards a narrow housing end and having an air supply inlet pipe subtantially co-extensive with that narrow end.

In order to avoid the inconvenience, and the turbulence, created by having motors for the rotors all substantially off-set from the respective rotors, for instance as shown in U.S. Pat. No. 5,131,935, it is desirable that the motor means for driving the motors are confined substantially within the periphery of the cascade spinner. If the cascade spinner has a closed outer housing, it is permissible for there to be, for instance, a single motor located within the housing and provided with appropriate drive belts and/or appropriate gearing to transmit the drive from that motor to the individual rotors. However it is strongly preferred that the motor means in the cascade spinner should comprise a motor for each rotor substantially co-axial with that rotor. This eliminates the need for belts or other means for transferring the drive laterally from the motor to the rotor. The provision of a motor for each rotor substantially co-axial with that rotor is a convenient way of providing a streamlined cascade spinner consisting of a series of individual rotor units, each containing a rotor and a motor.

The motors may be wholly enclosed within the housing of the spinner. However often the motors are located beyond the rear of the housing or at least beyond any rear wall in the housing, in order that they can be exposed to the cooling effect of air flowing along the housing. Any step at the front of a motor which would tend to distort flow is preferably provided with a baffle that faces downstream and that is at an angle of less than 30° to the axis. Since total streamlining at the rear end may not be critical, it can be permissible for the motors to extend slightly outside the area of the peripheral housing.

Preferably there are means for adjusting individually the speed of rotation of one or more of the rotors separate from one or more of the other rotors. For instance if each rotor is driven by its own associated, substantially coaxial, variable speed motor then it is possible to adjust the speed of rotation of each rotor independently of the speed of rotation of all the other rotors.

The cascade spinner must be provided with the primary air supply means for blasting air across the surfaces of the rotors at least in the outer periphery region of the rotors, that is to say in the regions of the rotors that are adjacent to the outer periphery of the cascade spinner.

The primary air supply means generally extend around at least one third, and usually at least half, of each of the subsequent rotors.

The primary air is intended primarily to assist in the formation and transport of fibres and so it should be provided for each of the subsequent rotors, off which fibre formation occurs. However it may also be provided for the first rotor, especially when the construction of rotors and the method of use of the rotors involves significant fibre formation off the first rotor.

Each primary air supply means generally comprises an annular slot. This may be a continuous slot or it may be a series of orifices that are adjacent to each other. The inner diameter of the slot (or the orifices) can be larger than the diameter of the associated rotor, for instance by up to 20 or even 50 mm in some instances, but it is generally preferred that the inner diameter should be substantially the same as the diameter of the associated rotor or not more than about 10 or 15 mm more.

The primary air blast may be wholly axial or may have a tangential component, so that the blast emerges from the slot in a helical direction. If it has a tangential component, there may be means in the slot for varying the angle of the air blast, for instance as described in WO92/06047, within the length of one or more of the slots.

The primary air supply means may consist of inner and outer slots, where the outer slot merges with or is close to the inner slot and wherein the slots are constructed so as to impart different directions of movement to the primary air as it is blasted through the inner and outer primary slots.

The primary air flows through the slot under substantially steady flow conditions such that it preferably flows along the rotor surface as a wall jet.

There can be secondary air supply means for blasting a secondary supply of air from the spinner. The secondary air supply means may be arranged as a further annulus outside the primary air supply slots or may be positioned in some parts only of the front face of the cascade spinner, for instance primarily beneath the rotors. This secondary air supply serves primarily to promote transport of the fibres away from the spinner.

Although the primary air blast, and any secondary air blast, generally emerges from the respective air supply means in a direction which is substantially parallel to the axis of the rotors, it may emerge with a non-axial component, or it may acquire a non-axial component after emergence, for instance due to helical rotation of the primary air stream, and thus may have an overall direction which is a diverging cone.

The primary air axial velocity is generally in the range 60 to 170 m/s, preferably 70 to 120 m/s. These values are calculated on the basis of the rate of flow ($Nm^3$ per second) through the area of the primary air supply means, i.e., the open area of the slots. If secondary air is blasted from the spinner, its axial velocity (measured in the same manner) may be in the same range or may be less, for instance down to 30 m/s.

The novel cascade spinner (with or without a surrounding tubular duct) can be used in a wide variety of cascade spinning processes for making MMVF, especially stone products. It can be used as a replacement for a conventional cascade spinner. It has the advantage that it can be lightweight and compact and its operation can use less energy than many conventional spinners. Accordingly the invention includes, inter alia, all processes for making MMVF products which utilise the defined cascade spinner which is enclosed within a spinner housing which defines a substantially closed outer periphery and in which the cross-sectional area of the first and subsequent rotors is at least 40% of the maximum cross-sectional area defined by the spinner housing, as explained above.

The benefit of the spinner is particularly significant when it is desirable or necessary to regulate the flow of air around the spinner, especially the flow of induced air around the spinner. In order to maximise the benefit of this, the cascade spinner is preferably mounted within a substantially tubular duct that surrounds the housing. For instance a substantially tubular duct may be mounted around and relatively close to the spinner so as to define a relatively narrow passage between the duct and the outer housing of the cascade spinner, often along the entire length of the spinner.

Preferably the tubular duct and the outer housing are both constructed to define between them a passage which provides for steady flow conditions to prevail in the air which is flowing through the passage. Thus the boundary layers of the air should remain substantially attached to, respectively, the outer wall of the spinner housing and the inner wall of the tubular duct, at least close to the front end of the spinner housing. Accordingly the inner wall of the tubular duct should be substantially streamlined, at least in the region close to the front end of the tubular duct and so should be substantially free of steps which have a radial depth and a downstream face angle such as to distort flow by separating the boundary layer from the inner surface of the duct.

If there is a relatively narrow passage between the spinner and the duct, it may be desirable to force air, for instance by a blower, through this relatively narrow duct to serve as secondary air for a spinner in which primary air is blasted through annular slots around the rotors.

In order to achieve sufficient primary air and transport air with conventional spinners, it is necessary to force very large volumes of air through the spinner. However the compact nature of the novel and other preferred cascade spinners, and the small cross-sectional area of the closed housing relative to the area of the rotors, and the ability to mount it in a substantially tubular duct that can optimise induced air flow, combine to allow for a significant reduction in the amount of air which has to be forced through the spinner. For instance the volume ($Nm^3/s$) of primary air typically can be less than half or even a quarter or less of the volume that is required in a conventional cascade spinner of similar fibre-forming capacity. This allows for a great reduction in the pipework and other equipment associated with the air supply means in the spinner. In particular, it allows for a very great saving in the energy which is required to provide the necessary primary air since the energy consumption is related to the third power of the volume (in $Nm^3$) of air.

The spinner can be mounted for pivotal or oscillatory movement alone or with the tubular duct and a preferred arrangement providing for such pivotal or oscillatory movement is described in more detail below.

Although the passage between the spinner and the outer substantially tubular duct can be relatively narrow, preferably there is a relatively large passage as a result of the open cross-sectional area in the open end of the duct around the spinner being quite large. The part of the passage which primarily controls the nature of the air flow that is carrying the fibres away from the spinner is the annular collar around the front end of the spinner and the front end of the spinner portion. Preferably at least 50% of the cross-sectional area of the front end of the spinner portion should be open to the flow of air sucked through the spinner portion by the suction means. Since the spinner is preferably closed to the flow of air sucked through the spinner housing, the cross-sectional area of the annular collar is preferably at least 50% of the cross-sectional area of the front end of the spinner portion. The open area is generally 50 to 95% of the total cross-sectional area of the open end of the tubular duct. Often the open area is at least 60%, but often not more than 80%, of the total area of the open end of the duct.

In order that subtantially steady flow conditions exist in the air passing through the collar the collar must be substantially streamlined (i.e., substantially free of flow-distorting protruberances) and must have a sufficient length that substantially steady flow conditions exist in the air emerging from the collar as a result of the air adjacent to each of the spinner and the tubular duct being attached as a boundary layer as it passes through the collar. The length of the collar required in order to provide substantially steady flow conditions in the air emerging through the collar will depend upon the construction of the spinner and tubular duct upstream of the collar (i.e., towards the rear end of the spinner). For instance steady flow conditions can be achieved in a relatively short collar if the tubular duct is constructed so as to provide acceleration of the air as it passes through the collar, due to the collar having a narrower cross-sectional area than the upstream parts of the passage leading to it. Thus it can be in the form of a nozzle. The collar can have a substantially uniform width over a very short axial length when a nozzle effect is being achieved but generally has an axial length of at least 5 cm where it has substantially uniform width relative to the spinner housing. Often the collar has a substantially uniform width over at least 25% of the length of the spinner housing.

The collar can be regarded as the annulus between the front ends of the spinner and the housing that controls the flow of air that emerges from the collar, and so can be very short in some instances where there may be acceleration within the passage, or longer when the passage has parallel sides.

The outer tubular duct can be generally cylindrical but if desired it can be conical or it can be conical merging into cylindrical at its front end. Often it is preferred that the substantially tubular outer duct should be substantially cylindrical except for a wider inlet area at its rear end which tapers towards a cylindrical body. Its cross section can be circular or non-circular, e.g., elliptical.

The substantially tubular wall of the spinner housing is generally non-circular and instead approximately follows the configuration defined by the arrangement of rotors, but if desired it can be truly cylindrical. Accordingly the annular passage between the housing and the tubular duct generally is not a regular annulus.

The width of the annular collar around the spinner can be subtantially uniform or it can be variable, with the collar usually being wider below the spinner than above it, as explained below. It is usually preferred that the collar is, however, substantially complete, in that preferably there is an open air passage around the entire periphery of the spinner. If any part of the collar is closed (which is usually undesirable) it is important that the collar should taper in width towards its closed part, so as to avoid turbulence at the point where the collar is closed.

Usually the assembly of the spinner in the tubular duct consists solely of the spinner, the substantially tubular duct, and means for suspending or otherwise mounting the spinner in the tubular duct so as to define a complete annular collar around the spinner. However if desired the tubular duct may contain one or more concentrically mounted or eccentrically mounted ducts within the main tubular duct, provided that these inner ducts do not create undesirable turbulence or eddies in air being induced through the annulae defined between the inner and outer ducts and provided these inner ducts do not reduce unacceptably the overall open area of the collar and through which air can flow through the duct. For instance they may be a tubular duct surrounding and close to the spinner housing and an outer tubular duct surrounding it. The total passage for the flow of induced air, and the collar, is thus divided into inner and outer annuli by the inner duct but the passage, and the open area, is not significantly altered by the presence of the inner duct.

It is also possible to provide for tubular pipes or other pipework to extend, generally substantially parallel to the spinner and outer tubular duct, from at or near the rear of the spinner to the front end of the duct. For instance a secondary air blast may be introduced beneath or around the spinner in this manner. It is generally desirable to keep such pipes or other supply devices to a minimum since they reduce the open area between the spinner and the tubular duct. Again such supply pipes or other devices should be sufficiently streamlined to avoid creating undesirable turbulence in air flowing through the annular passage.

The length of the tubular duct extending rearwards of the front face of the spinner is usually at least 30%, and preferably at least 60%, of the length of the spinner, that is to say the distance from the front face of the rotors to the rear end of the housing or, if further, to the rearmost part of the rearmost motor. Often the duct is at least as long as the spinner and frequently is three times, or even five times the spinner length or more.

The front end of the tubular duct is preferably substantially coplanar with the front end of the spinner, and in particular it is generally substantially coplanar with the front face of the spinner. If the tubular duct has a front face that is too far downstream of the spinner the fibres and shot that are thrown off the rotors will be liable to foul the front end of the tubular duct, instead of being thrown into the collecting portion of the chamber. If the tubular duct has its front end undesirably upstream of the spinner housing there is a reduction in the control of the induced air around the front end of the spinner.

It is necessary to be able to pour melt on to the top rotor from outside the chamber. It may be sufficient to provide an opening in the top of the tubular duct to allow melt to be poured through this opening direct on to the top rotor, but often there is an opening in the tubular duct and a gutter leading from beneath this opening to above the rotor. Melt can thus be poured through the opening on to the gutter and from the gutter on to the top rotor.

When the cascade spinner is mounted in the spinner portion of the chamber or in some other tubular duct defining a relatively large open area around the spinner, it is preferred to mount the spinner in a position higher than the central position of the tubular duct. This allows for a larger amount of air to be induced beneath the spinner than around and above the spinner, and this can provide for improved transport of fibres towards the collector.

Generally the spinner is mounted so that the vertical separation between the lowermost subsequent rotor and the lower part of the tubular wall of the tubular duct is at least 1.2 times and preferably at least 1.5 times the vertical separation between the top of the first rotor and the uppermost part of the wall of tubular duct. The ratio between these lower and upper separations is usually at least 2 and often at least 3 or 4. It can be as high as 10 and indeed in some instances it may be unnecessary to have any significant air flow along the top of the spinner, in which event the ratio may be very high. Generally, however, the ratio is below 20, and frequently below 10.

The maximum horizontal transverse dimension of the spinner is frequently the width of the spinner on a horizontal line extending substantially through the axis of the second subsequent rotor. The width of the spinner measured through this axis is generally from 25 to 75%, often around 30 to 60%, of the width of the chamber measured at the same horizontal position. This ensures that there is an adequate open area around each side of the spinner.

The spinner is normally mounted within the tubular duct so that the ratio of the separation between the lowermost subsequent rotor on one side and that side of the tubular duct to the separation of the lowermost subsequent rotor on the other side and that other side of the tubular duct is reasonably close to 1:1, for instance in the range 3:1 to 1:3, preferably 2:1 to 1:2.

Conventional cascade spinners are mounted on a solid base, typically a concrete floor or on rails. Because of their weight, they are relatively difficult to move, even though they may be mounted on wheels. An advantage of the novel spinners of the invention is that they are very compact and lightweight and so do not have to be mounted on a solid base. Instead they can be suspended from suitable supports. In particular, the spinner can be suspended from the sides and/or upper parts of the tubular duct. The spinner can be suspended by a hanger from the top of the tubular duct or it can be suspended by a plurality of supports, such as plates or rods, which extend from the sides and/or upper parts of the tubular duct.

The means for suspending or otherwise mounting the spinner in the tubular duct can include means allowing for oscillation of the spinner, with respect to the tubular duct, about a substantially vertical axis or about a horizontal axis which can be substantially parallel to the axes of rotation of the rotors or substantially perpendicular to them. Alternatively, the entire assembly of tubular duct and spinner may be mounted for such oscillation or pivoting.

Preferably the spinner and its surrounding tubular duct are mounted for oscillation together about a vertical axis since this ensures that induced and forced air flowing through the duct will tend to oscillate with the oscillation of the spinner. Oscillation of the spinner about a substantially vertical axis is typically through a relatively small oscillation angle, often 5 to 30° (e.g., 2.5 to 15° either side of a central axis). The total angle of oscillation is generally at least 7° and usually at least 10°. It is generally unnecessary for it to be more than about 25° and often it is not more than about 20°. A range of around 14 to 20° is often suitable.

The oscillation is preferably conducted at a frequency of at least 0.05 Hz, usually at least 0.1 Hz. It can be conducted at values of up to, for instance, 2 Hz but 1 Hz is normally a convenient maximum. A frequency of about 0.3 to 0.6 or 1 Hz is usually preferred. The oscillation can be applied continuously or occasionally. The frequency of oscillation can be varied in accordance with process conditions. For instance the rate of travel of the collector may be varied in proportion to the rate of collection of web so as to provide a substantially uniform weight per unit area of web despite variations in the throughput of melt. Preferably the frequency of oscillation is varied in accordance with the rate of travel of collector in that the frequency can increase as the rate of travel increases and can decrease as the rate decreases. Preferably the frequency is varied in substantially direct proportion to the rate of travel of the collector so that one cycle of the oscillation corresponds to a substantially constant length of travel of the collector.

The oscillation about a substantially vertical axis can have a beneficial effect on the uniformity of fibre lay-down on the collector and can improve properties of batts, for instance made by cross-lapping the web that is formed on the collector.

Oscillation of the spinner, or the spinner and duct, about a substantially horizontal axis which is substantially perpendicular to the axes of rotation likewise can be at a similar rate and can have a beneficial effect on fibre lay-down.

Oscillation of the spinner is preferably about a substantially horizontal axis substantially parallel to the axes of rotation of the rotors and can be a repeated oscillation but preferably takes the form of an adjustable pivoting of the spinner from one fixed position to another fixed position. Usually the spinner pivots within the duct, but if desired the duct and spinner can pivot together. By this means it is possible to vary the angle between a horizontal line passing transversely through the centre of the first rotor and a line drawn between the centre of the first rotor and the centre of the first subsequent rotor. Typically the spinner is mounted so that it can be controllably pivoted such that the described angle can have any selected value generally within the range zero to 30°, often zero to 20° most usually around 5 to 10°. Varying this angle, and consequently the angular disposition of the second and any third subsequent rotor relative to each other, can significantly influence fibre formation.

Although it is desirable that the annular passage defined between the spinner and the tubular duct should be substantially streamlined, it can be desirable to include guides in the passage for imparting a non-axial component to air flowing through the passage. These guides can be arranged so as to provide an overall helical component to the air passing through the passage means. Preferably however the guides are constructed so that each can impart a non-axial movement to an axial segment of the air flowing through the passage, since this allows for the guides being shaped to provide different non-axial movement to different axial segments of air flowing through the passage. For instance the guides in one lowermost quadrant of the tubular duct may tend to impose a clockwise rotation to the air passing through that quadrant, while the guides in the adjacent quadrant may tend to impose a counter-clockwise rotation to the air passing through that quadrant, or vice versa. For instance the air flow in any particular region, e.g., beneath the spinner, can be maximised by this technique.

The guides can be fixed and permanently shaped blades to provide these different non-axial movements to different parts of the air flow, but preferably the guides are adjustable so that the direction of air flow can be adjusted during use of the apparatus in response to variations in performance.

In addition to the guides causing rotational movement, it is generally preferred that they are shaped and positioned to promote an outward conical component to the air flowing out of the tubular duct, for instance away from the spinner and towards the collector.

The guides are usually in the front end of the substantially tubular duct surrounding the spinner. The guides can be on the spinner but preferably they are blades mounted on the inner wall of the tubular duct extending in a substantially longitudinal direction so that they do not create unacceptable blockage of the passage between the spinner and the tubular duct.

Small jets of forced air can also act as guides, in which event such jets may be on or in the spinner housing or on the tubular duct.

The spinner of the second aspect of the invention is preferably used in the first aspect wherein the described tubular duct is the tubular duct of the spinner portion of the chamber of the first aspect. The collecting portion of the chamber in the first aspect is preferably constructed so as to minimise, and preferably substantially prevent, the opportunity for air to be sucked into the collecting portion (by the suction means that apply suction through the collector) except through the tubular duct and, optionally, other known inlets that allow for the entry of non-interfering amounts of air. For instance some leakage into the chamber will usually occur from the pit that is preferably provided beneath the open end of the duct for collecting shot, but the amount of air that enters through this can easily be controlled so that it does not significantly influence the performance of the process.

Generally the chamber is substantially closed except for the collector through which suction is applied and the open area of the open end of the duct around the spinner and except for inlets for desired additives. For instance recycled MMV fibres entrained in air can be introduced into the collecting chamber through one or more inlets in the walls of the chamber.

The air forced through the spinner is usually only the primary air but, as mentioned above, there can be secondary air forced through the spinner as well as primary air. Optionally a controlled and non-interfering amount of air, less than the air that is forced through the spinner and sucked through the open area of the duct, can also be allowed to enter the collecting portion of the chamber through the spinner end. For instance a controlled amount of secondary air can be forced through passages in the spinner end of the collecting portion or a controlled amount of air may be sucked through annular or other openings in the spinner end of the collecting portion.

Preferably at least 50%, and generally at least 75% or at least 85% of the total volume of air (in $Nm^3/s$) that is sucked out of the chamber (through the collector) enters through the tubular duct and spinner.

Air is sucked through the collar as a result of the suction which is applied through the collector into the substantially closed collector portion. Usually the air flow through the collar is induced in this manner and there are no means for forcing any air, or significant quantities of air forward through the duct. However in some instances it may prove useful to provide such means (for instance a blower at the open rear end of the duct) to assist in control of the induced air sucked through the duct.

As a result of constructing the chamber so that most or substantially all the air sucked through the collector has to be provided by the air blasted through the spinner and induced through the tubular duct, and as a result of ensuring that the open area around the spinner through the duct is sufficiently large, it is possible easily to control the induced air flow through the passage so as to minimise turbulence in the collecting portion of the chamber. With conventional spinners having a very high primary air velocity and a low air velocity around (and often spaced away from) the spinner, very high velocity gradients prevail in a radial direction around the spinner and these necessarily cause significant turbulence. In the invention, it is easily possible to control the supply of primary air and the degree of suction so as to minimise unacceptable velocity gradients.

In particular, the forced air and the dimensions of the apparatus are preferably such that the mean axial velocity of the air induced through the open cross-sectional area of open end of the tubular duct is 5 to 40%, usually 5 to 30%, of the mean axial velocity of the primary air. Generally it is 10 to 20 or 25% of the axial velocity of the primary air. The mean axial velocity of the induced air is calculated from the rate of flow of the air ($Nm^3/s$) and the open area of the open end around the spinner and through which it is flowing.

Generally the mean axial velocity of the induced air is 5 to 50 m/s, preferably 10 to 35 m/s. For instance in a typical process the primary air may be forced at 100 m/s and the induced air may have a mean velocity of 25 m/s. This contrasts with corresponding figures of, for instance, above 130 m/s and below 10 m/s in a conventional spinner.

A particular advantage of the apparatus is that it is now possible for the amount (in $Nm^3/s$) of forced primary (or primary and secondary) air to be a smaller proportion of the total amount of air (in $Nm^3/s$) entering the spinner portion, and/or sucked through the collector, than with conventional spinners. For instance good results can be obtained when the proportion is below 10% and often below 8%, for instance in the range 3 to 6%. This not only reduces energy requirements, as discussed above, but it also facilitates maintaining substantially steady flow conditions for as long as possible where the primary air merges with the induced air. This is because there is less tendency for turbulence to occur when the primary air stream has, for instance, a maximum axial velocity of 120 m/s and provides 5% of the total volume of air and the secondary air stream has a maximum velocity of 40 m/s and provides 95% of the volume than when the primary stream has a maximum velocity of 160 m/s and provides 10% of the volume and the secondary air stream as a maximum velocity of 10 m/s and provides 90% of the volume. Additionally, the non-turbulent merging of the streams is facilitated by their close juxtaposition as they emerge from the front of the spinner, in contrast to their juxtaposition when there is a significant radial step between the outer edge of the housing and the outer edge of the primary air slot.

Thus it is now possible to promote the maintenance of substantially steady flow conditions in the air stream even after it has left the collar and, in particular, after the air sucked through the collar has passed the rotors and is merging with the primary air in the collecting portion. Accordingly, in the region in front of the spinner in the collecting portion, for instance in the first 20 cm or perhaps 50 cm the path lines of the air, i.e., the paths followed by fibres entrained in the air, are preferably substantially all non-turbulent and lead from the substantially streamlined path lines through the collar in an essentially non-turbulent manner towards the collector.

By minimising turbulence and disruption of the path lines in the collecting portion the formation of tufts and balls in the fibres entrained in the conveying air is minimised.

In order that substantially steady flow conditions do tend to prevail in, for instance, the first 20 cm in front of the rotors where the primary and secondary air streams merge, it is necessary that the front end of the spinner portion should merge with the collecting portion in preference to merely leading into a collecting portion having an abruptly increased width for the travel of entrained fibres, because of the back eddys that would be formed in the region where the width does increase abruptly.

However it is generally preferred that the collector (and therefore the base of the chamber) is wider than the width of the spinner end of the collecting portion. In order to provide the desired merging, rather than an unacceptable, flow-disrupting, step, it is preferred that the side walls of the collecting chamber, or air guide baffles within the side walls, should diverge outwardly substantially conically from adjacent to the open end of the spinner portion and towards the collector. This avoids any significant sudden increase in the effective width of the collecting chamber such as to create unnecessary turbulence in the chamber. Similarly it is desirable that the top wall which defines the upper part of the collecting portion should also be shaped in a substantially streamlined manner, and thus it preferably extends substantially conically upwardly from the top of the open end of the spinner portion.

Although the majority of the melt is converted by the centrifugal spinner to fine fibres which are carried by the air towards the collector, some of the melt is thrown off the fibres as unacceptable shot, that is to say coarse fibres or larger lumps of melt. There is generally a pit below the open end of the spinner portion in which shot may collect, and generally there are means for collecting into the pit shot which is thrown radially outwards from adjacent the open end of the spinner portion. Preferably this collecting means comprises a collecting zone that opens inwardly around the open end for reception of shot, and leads downwardly to the pit, and the substantially conical air guide baffle separates this collecting zone from the remainder of the collecting chamber.

The main flow of fibres and air is thus constrained within the area defined by the substantially conical air guide baffle while the shot is thrown through the gap between the baffle and the open end and falls down into the pit, from which it may be removed by a screw or other continuous or batch removal device.

The collector generally has a width greater than the width of the open end of the spinning portion, for instance 1.1 W to 2 W, were W is the maximum width of the open end of the spinning portion.

As a result of arranging that the air flow through the open area of the tubular duct and into the collecting portion is as non-turbulent as possible, the amount of balling and tufting of the fibres is minimised. Also, as the fibres are carried from the spinner towards the collector, the proportion of fibres that are arranged substantially parallel to the direction of travel, and thus in a substantially laminar configuration, is maximised.

It is desirable to collect the fibres while they have as high a proportion as possible in a substantially laminar arrangement and with a minimum proportion in a ball or perpendicular arrangement. Preferably therefore the collector should be positioned so as to minimise the length of travel of the fibres from the spinner to the collector. This minimises the opportunity for loss of laminar configuration and attainment of a ball configuration.

The horizontal distance from the bottom of the lowermost subsequent rotor to the collector is therefore preferably not more than 2 W or 2.4 W, where W is the maximum width of the open end of the spinner portion. Preferably it is at least about 0.8 W, often at least about W. Typically it is less than 2 meters, or at the most 3 meters, but is usually more than half a meter or, more usually, more than 1 meter.

The collector should be as steep as is practicable, so as to minimise the horizontal travel of fibres through the chamber to the top of the collector. Generally the collector is positioned in the collecting chamber at an angle of at least 60° to the horizontal. It can be at an angle of up to 80° or even 90° (i.e., perpendicular) and if desired the top of the collector can even lean towards the spinner, for instance with the collector at an angle of as much as 110° or even 120° to the horizontal. Naturally the suction applied through the collector must be sufficient to hold the web on the collector, but since the web can have a light density only a relatively low suction is required for this.

The collector is usually a continuous permeable belt through which the desired degree of suction is applied subtantially uniformly over the area of the belt and by which the web of fibres which collects on the belt can be substantially continuously carried out of the chamber. Generally the collector carries the web upwardly out of the chamber. However it can, if desired, be arranged to carry the web downwardly out of the chamber.

The web can then be subjected to conventional post-treatments such as cross-lapping and consolidation. Preferably the rate of removal of the web is sufficiently fast that the web is very light, e.g., below 400 g/m$^2$, often 200–300 g/m$^2$ if the web is then cross-lapped or otherwise laminated to form the final batt.

Binder may be introduced into the web in conventional manner, for instance by binder sprays located in or on the spinner, for instance coaxial with one or more of the rotors, or by binder sprays around the spinner or in the collecting chamber.

The melt that is supplied to the spinner to form the MMV fibres can be any suitable melt of the type conventionally used for forming stone wool (i.e., material described as rock, stone or slag wool rather than glass wool) and thus typically contains various elements including significant amounts of $SiO_2$ and usually at least 15% alkaline earth oxides (CaO and MgO) and relatively low amounts (usually below 10%) alkali metal oxides. The amount of $Al_2O_3$ can be low (below 10% and often below 4%) or it can be higher, e.g., up to 30%. Any of the conventional melt-forming compositions can be used. A typical melt is given in WO92/12941. The melt temperature is generally in the range 1400° C. to 1600° C. on the top rotor.

In order to increase the production of a plant without reducing product quality, it can be convenient to restrict the throughput of melt on a cascade spinner and to increase the number of cascade spinners.

For instance there can be two cascade spinners in side-by-side relationship within an appropriately shaped spinner portion (generally a substantially elliptically shaped tubular duct) but more usually there are at least two of the cascade spinners each positioned within its own associated spinner portion. These spinner portions may be arranged substantially parallel to one another so that each opens to the spinner end of a single collecting portion. Thus a single collecting portion may be supplied by two or more spinner portions and there may be a single collector for receiving the fibres from both spinners.

Often, however, two or more assemblies of the spinner and chamber are arranged in side-by-side relationship. Thus one apparatus comprising the defined spinner and chamber may be arranged in side-by-side relationship with at least one other assembly of spinner and chamber.

Each spinner may be provided with melt from its own dedicated cupola or other furnace, but often a single furnace will supply melt to two or more spinners.

By the invention it is easily possible to adjust the rate of supply of melt and the conditions of operation so that the fibre diameter can be relatively coarse, for instance 3.5 to 5.5 $\mu$m, or relatively fine, for instance 2 to 3.5 $\mu$m, and the product can have relatively low density, for instance 20 to up to 100 kg/m$^3$, or relatively high density, for instance 100 to 300 kg/m$^3$. This can be achieved easily merely by altering the speed of rotation of one or more of the rotors and/or by pivoting the spinner about a horizontal axis so as to change the angles between the first and subsequent rotors.

The resultant MMVF materials can be used as, for instance, fire, heat or sound insulation or protection, as an agricultural growing medium, or as a filler, or for other conventional MMVF purposes.

A particular advantage of the invention is that it is easy to control and perform the process efficiently, thus allowing for reduced production costs or improved products, or both. For instance it is easily possible to obtain a good combination of lambda, density and tensile strength using very economically advantageous operating conditions such as melt capacity and energy input (for the forced air supply and for the rotors).

The shot content can easily be below 35% by weight, for instance below 32%, and often in the range 25 to 30%. The tensile strength (measured in conventional manner on a slab 100 mm thick having a density of 30 kg/m$^3$ and 1.2% binder content) can easily be, as initially manufactured, at least 10 and often at least 13 kN/m$^2$ up to for instance 18 or 20 kN/m$^2$.

A particlar advantage of the products of the invention is that they can maintain an unusually high proportion of their tensile strength after being compressed 30 to 60% for 24 hours. This test gives an indication of the tensile strength after conventional compression packing, and usually results in a reduction of 40% or more. In the invention the reduction is less than this, typically in the range 10 to 20 or 30%.

By the invention it is easily possible to make a product which, after compression, has a tensile strength of 8 to 15, often 9 to 14, kN/m$^2$. Since the products of the invention can retain more of their tensile strength after compression than conventional products, and since the choice of product for any particular purpose is often dictated in part by its tensile strength, it follows that a benefit of the invention is that it is possible to provide a tensile strength after compression much more economically than can be achieved when the initial product loses a large amount of its tensile strength during compression. By the invention it is possible to achieve products having, for instance, a density-lambda relationship approaching or equivalent to the relationship defined in WO92/12941, in a very economical and convenient manner.

The invention is now illustrated in the accompanying drawings in which.

Figure 1:
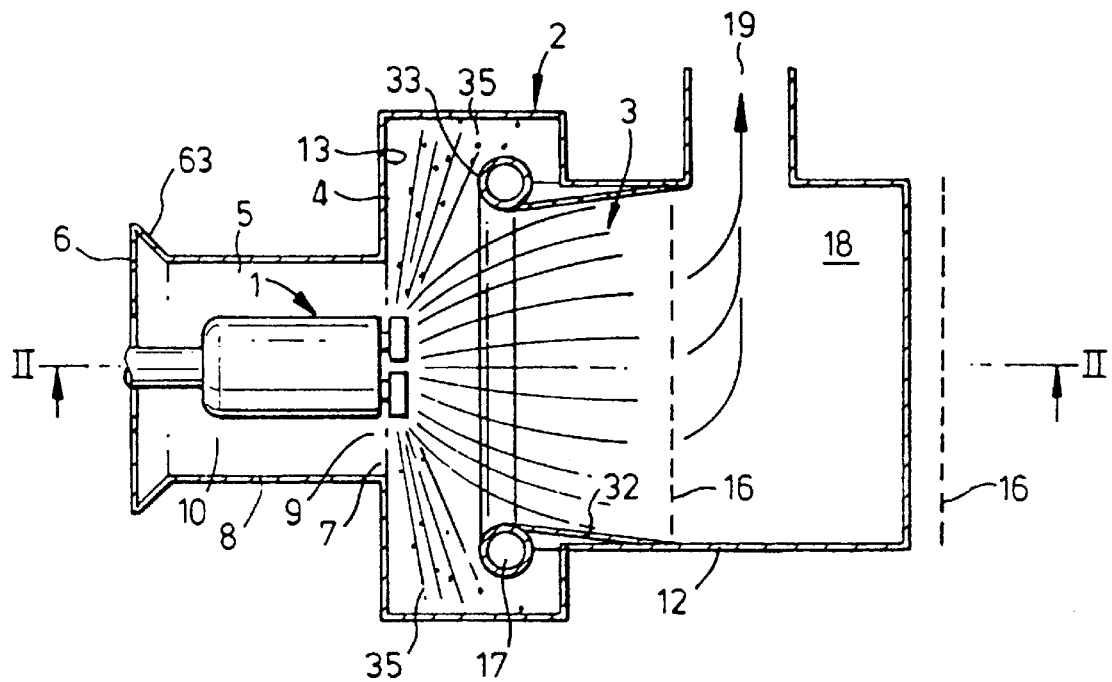
FIG. 1 is a longitudinal horizontal cross section of apparatus according to the invention (taken on the line I—I in FIG. 2).
Figure 2:
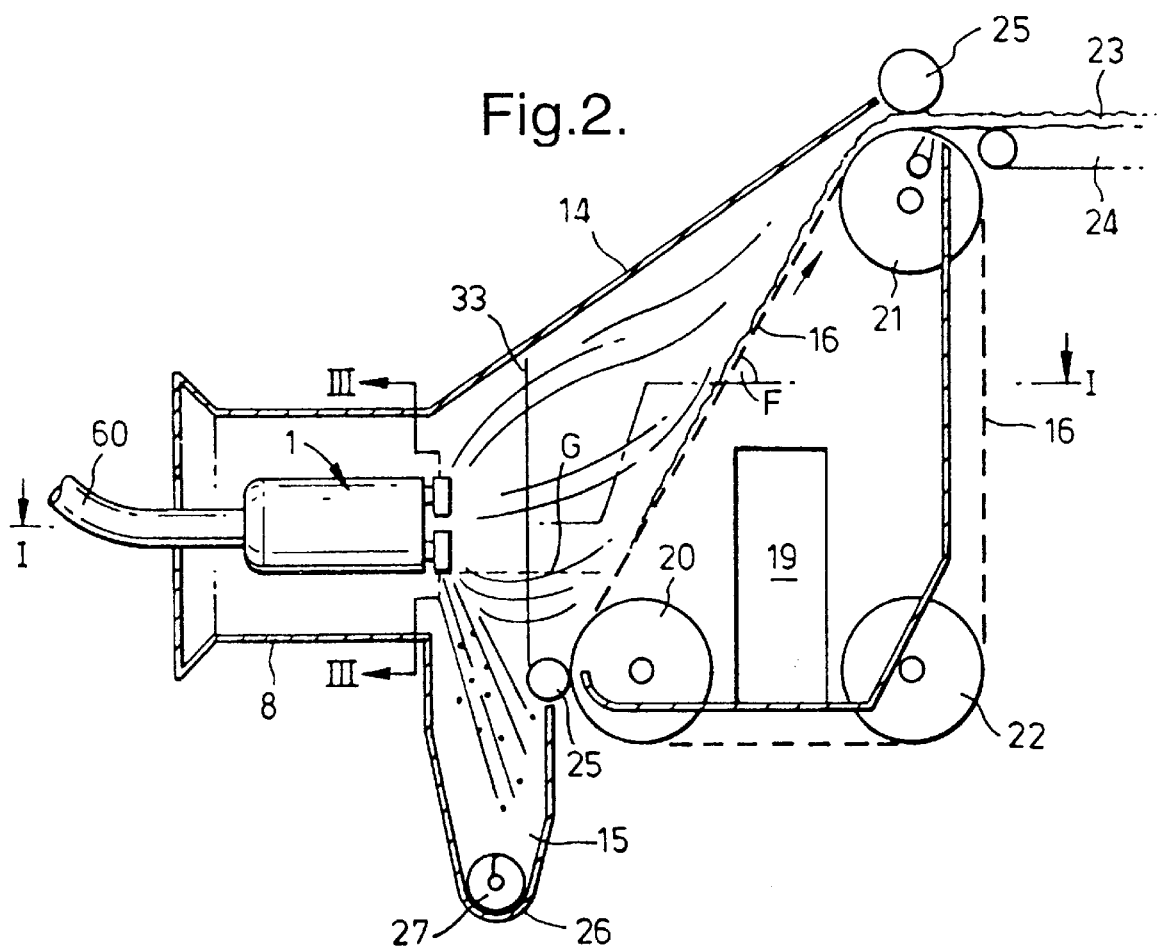
FIG. 2 is a longitudinal vertical cross section of the same apparatus (taken on the line II—II in FIG. 1).
Figure 3:
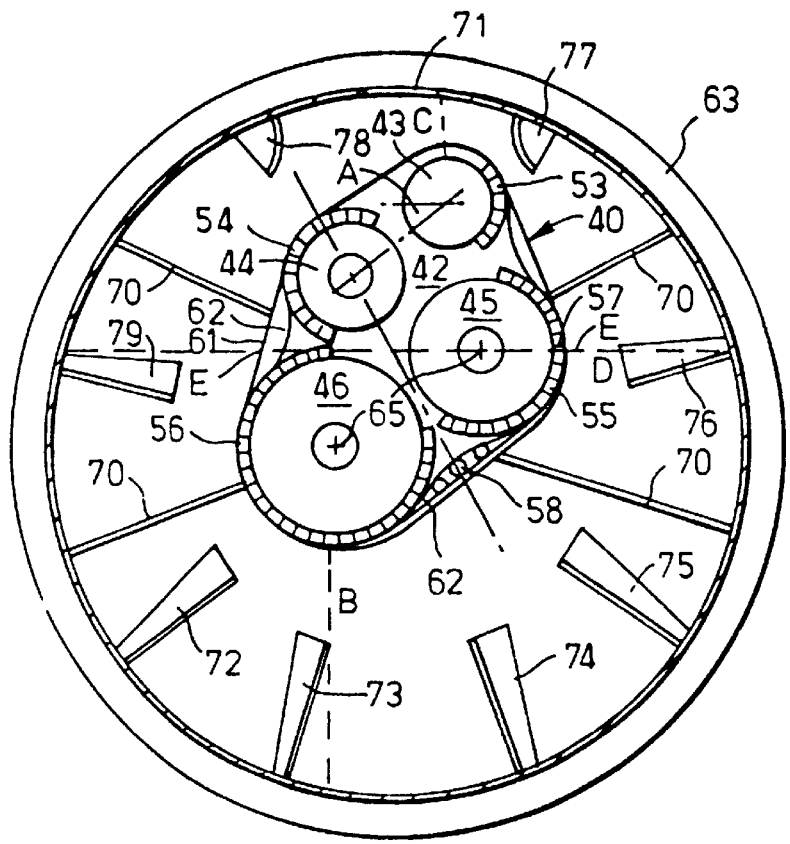
FIG. 3 is a transverse cross section taken on line III—III in FIG. 2 and shows the novel spinner in more detail (it is shown diagrammatically in FIGS. 1 and 2).

The apparatus comprises a cascade spinner 1 located within a chamber 2 which comprises a collecting portion 3 which has a spinner end 4 adjacent to the cascade spinner 1, and a spinner portion 5. This spinner portion 5 has a rear end 6 which is open to the atmosphere and a front end 7 which opens into the spinner end of the collecting portion 3.

There is a substantially tubular duct 8 extending between the front end 7 and the rear end 6. The front ends of the cascade spinner 1 and the duct 8 define between them an open annular collar 9. Air can be induced to flow through this collar from along a passage 10 extending back from the collar 9 towards the rear end 6.

In the apparatus which is shown, the collar 9 merges with and is coextensive with the passage 10, since the spinner and duct are both shown as being substantially parallel sided. However if the tubular duct 5 is, for instance, in the shape of a converging cone the annular passage 10 will have decreasing open area towards the front of the spinner, and the relevant open cross sectional area around the spinner for axial forward flow of induced air from the passage will then be the collar 9 between the spinner and the front end 7 of the spinner portion 5.

The collecting portion 3 has side walls 12, end walls 13 merging with the spinner portion, a top wall 14 merging with the spinner portion and with the side walls, and a base comprising a pit section 15 and an inclined conveyor 16. Behind the collector 16 there is a suction chamber 18 from which air is drawn by a suction pump 19. The suction chamber 18 is coextensive with the collector 16 and thus sucks air from the collection portion over the entire area of the collector, although the greatest amount of suction will be applied where the web is thinnest.

The collector 16 is conveniently a slatted conveyor belt or other porous carrier that can run continuously around rollers 20, 21 and 22.

During operation of the apparatus, fibres collect on the collector 16 to form a thin web 23 which is carried upwardly by the collector and is taken off by the take-off apparatus 24. From that position it can be subjected to conventional treatments such as cross lapping and consolidation. Rollers 25 act as seals to prevent significant ingress of air around the conveyor.

The pit zone 15 includes a trough 26 set in the base of the pit area and having a closed end and a sluice or rotary valve at the opposite end (not shown). A screw conveyor 27 rotates within the trough 26 to carry shot which collects in the trough out through the sluice or valve. This openable end may be permanently open, provided that it is designed such that only a limited amount of air can enter through it, or it may be opened from time to time to allow the discharge of shot by the conveyor from the trough.

There are air guide baffles 32 in each side of the collecting chamber extending from the wall 12 to an open edge 33. These air guide baffles 32 diverge outwardly substantially conically from the edge 33 which is adjacent to the open end 7 of the spinner portion. The top wall 14 also extends substantially conically upwards. Preferably the angle that the top wall and each of the air guide baffles makes to the axial direction is not more than about 45°, preferably about 15 to 30°.

There is a shot collecting zone 35 around the open end 7 of the spinner portion. One side of the collecting zone is defined by the chamber end wall 13 and the other is defined by the edge 33 and the baffle 32. Shot thrown radially outwards from the spinner is thrown through the gap between edge 33 and wall 13 into the zone 35. The side wall 12 merges inwardly near its base with the baffle 32 so as to cause shot that slides down the collecting zone 35 to fall into the trough 26.

The spinner 1 comprises a peripheral tubular housing 40 closed at its rear end by an end plate 41 and at its front end by a facing plate 42. A top first rotor 43 and subsequent rotors 44, 45 and 46 are mounted as a cascade in conventional manner, so that melt thrown on to rotor 43 is accelerated and thrown on to rotor 44, optionally with some fibre formation on rotor 43, some of the melt on rotor 44 is thrown off as fibres while the rest is thrown on to rotor 45. Some of the melt on rotor 45 is thrown off as fibres while the rest is thrown on to rotor 46, off which it is thrown as fibres. Each rotor is mounted on an axle 47, which conveniently rotates within a fixed sleeve 48 around bearings 49. Rotation of the axle is caused by a motor 50, there being one motor 50 mounted on each axle. The motors 50 may be enclosed within the housing 40 or may be positioned behind the rear plate 41 if desired.

It is necessary that there should not be any significant inward steps in the passage 9 sufficient to disrupt severely the flow of air past the front of the spinner. Disruption of the flow at the back of the spinner is less important and so small steps there can be tolerated.

Annular slots 53, 54, 55 and 56 extend around the outer peripheral regions of each of rotors 43 to 46 respectively, except that slot 53 is around only a small part of the outer peripheral portion of rotor 43. The inner edge of each slot has the same diameter and is coaxial with the associated rotor. Blades 57 are positioned within each slot to regulate the angle at which air emerges from the slot. All the blades in a slot can be aligned in a similar manner or they can be aligned at different angles so as to impart variable amounts of tangential flow to the air that emerges from each slot.

There is an air chamber 59 within the housing 40 for leading air simultaneously to each of the slot and for blasting it out of the slots at, for instance, 100 m/s. This chamber leads from an air supply pipe 60 by which air is forced under pressure and at high speed towards the slots 53 to 56. This air emerges as the primary air.

In order to modify the air flow, air can also be forced out of the housing through other positions, for instance thorough orifices 58 leading from supply duct 64, and this is the secondary air.

The outer profile of the housing 40 follows throughout most of the length of the spinner, towards the front, the line 61. However if the spinner followed this line up to the rotors, the junction of this shaped outer housing with the front face 42 would create a significant inwards step in the areas 62 between each adjacent pair of rotors. Accordingly the housing in these areas 62 is tapered inwardly, at an angle of around 20 to 30° so that the area of the front face 42 is less than the total area defined by the line 61. This tapering is usually conducted over, for instance, the 5 to 10 cm closest to the rotors.

Although the duct 8 and the spinner housing 40 are shown as being parallel sided and defining a substantially parallel sided annular passage they can have other shapes, provided they are adequately streamlined. There is an outward flare 63 in the tubular duct 8 so as to facilitate the collection of air into the duct.

The spinner is provided with binder sprays 65 coaxial with and on the front edge of each of the rotors and supplied by pipe 66, in conventional manner. Binder sprays may also be provided elsewhere on the front face of the spinner and/or on jets positioned around the spinner in the open end 7 of the spinner chamber 5.

The spinner is suspended by plates or rods 70 from the sides and top of the tubular duct 8. These rods can be rigid but if desired they can be provided with means for synchronised extension and contraction so as to provide means for pivoting the spinner about its longitudinal axis or for oscillating it about a transverse horizontal axis or a vertical axis. Pivoting about a longitudinal axis is useful since it allows for adjustment of the angle A, that is to say the angle between the horizontal and the line joining the centres of the rotors 43 and 44.

The tubular duct 8 is provided with an opening 71 through which melt can be poured on to the top rotor 43 or on to a gutter (not shown) which leads towards the collection portion and discharges melt on to the top rotor.

There are a series of guide blades 72 to 79. These are shaped so as to impose the desired air flow direction on air that is flowing through the passage 9 and the open area around the spinner. They can be fixed or adjustable. For instance the segment of air flowing past blades 72 and 73 can be directed counterclockwise whilst the segment flowing past blades 74 and 75 could be directed clockwise, so as to increase the flow of air beneath the spinner. The blades 77 and 78 could be shaped so as to cause the segment of air passing them to flow conically upwards, so as to follow the line of the chamber top wall 14. Other configurations of blades can be selected and preferably they are provided with means for adjusting their configuration during operation.

The separation B between the lowermost subsequent rotor 46 and the lower part of the tubular wall 8, vertically below the rotor, is considerably greater than the separation C between the uppermost part of the first rotor 43 and the part of the tubular duct 8 vertically above it. As shown, the ratio B:C in the drawing is around 4:1.

The transverse horizontal line D through the axis of the second subsequent rotor 45 (i.e., the third rotor in the fascade) is generally at a position which is at or close to the widest part of the spinner. At this position, the distance between points E, where the line intersects the spinner housing in the drawing is around 50% of the total width of the chamber at this position. The separation, that is to say the horizontal distance, between rotor 45 (which is the lowermost subsequent rotor on the righthand side) and the adjacent side of the chamber in the drawing is approximately the same as the separation between the lowermost rotor on the other side, rotor 46, and the horizontally adjacent wall of the duct 8.

The total area of the front faces of the rotors 43, 44, 45 and 46 is at least 40% of the maximum cross-sectional area of the housing, defined by the line 61 and preferably it is at least 50% of the maximum area in the front 10 cm of the housing.

The angle F between the collector 16 and the horizontal can be, for instance, 70°. The distance G of a horizontal line from the bottom of the lowermost rotor to the conveyor is, in the illustration, approximately the same as the diameter of the tubular duct 8 but is preferably about 1.5 to 3 times (usually about twice) the diameter of the duct 8. The maximum width of the collector 16 is, in the illustration, almost twice the diameter of the tubular duct.

Instead of or in addition to mounting the spinner on supports 70 that provide for pivoting or oscillation, the entire duct 8 may be mounted for pivoting or oscillation with respect to the collecting portion 3. If this is done, it is necessary to ensure that the movement of the duct relative to the end walls 13 of the collecting portion does not allow for unacceptable ingress of air. Appropriate gasketing may be required around the duct to prevent this.

Figure 6:
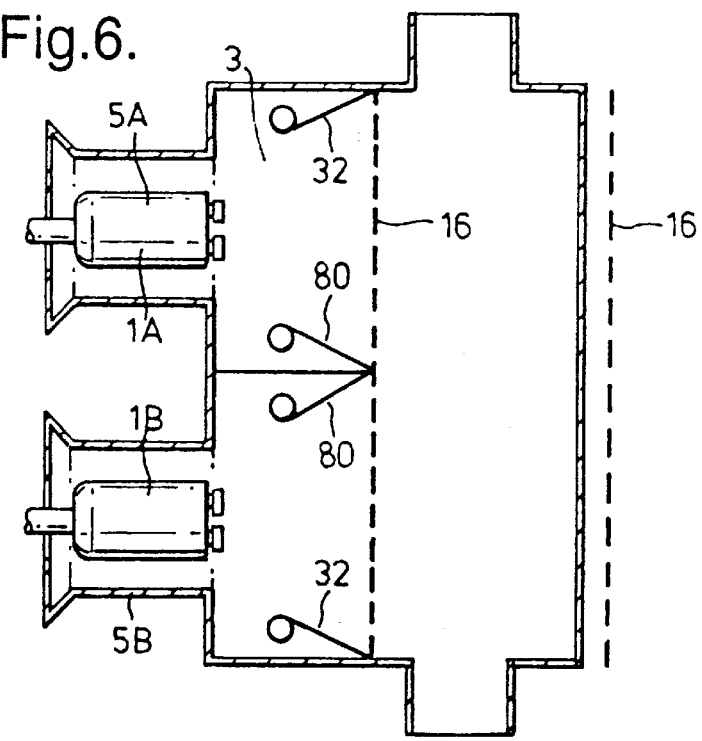
FIG. 6 is a cross section similar to FIG. 1 but of an apparatus having two spinners.
Figure 4:
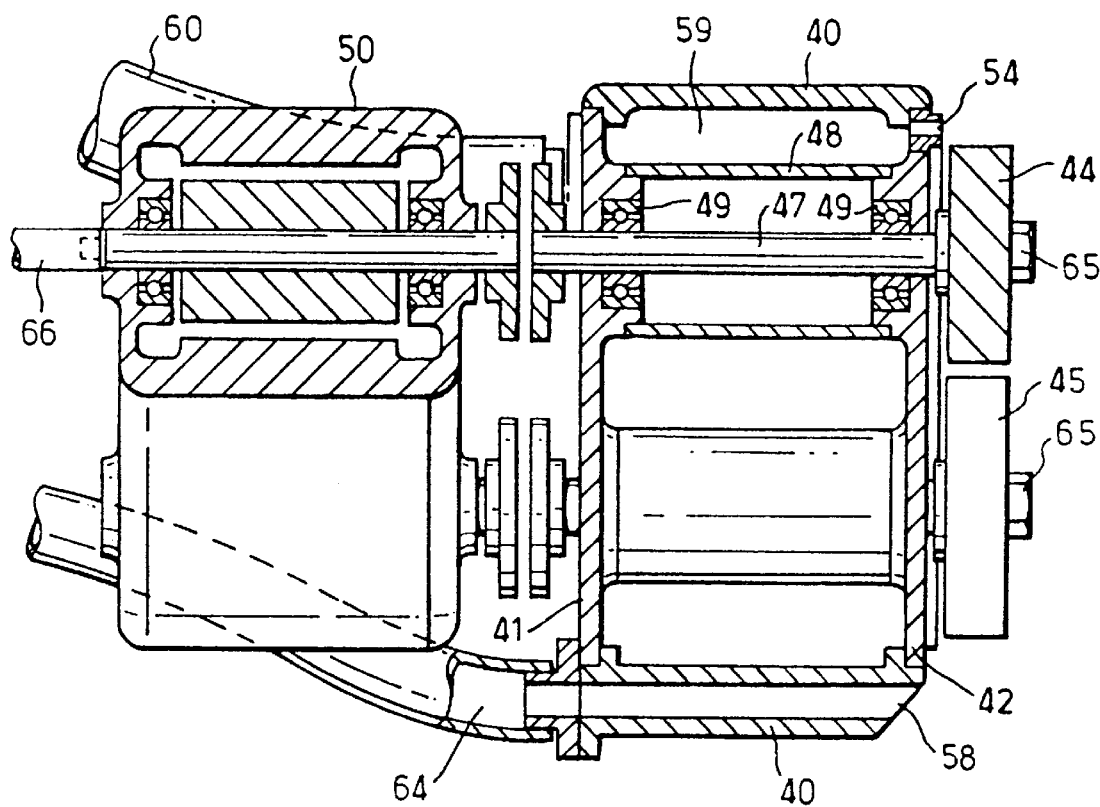
FIG. 4 is a longitudinal cross section of the spinner shown in FIG. 3, taken on the line IV—IV (not to scale).

If it is desired to increase the yield from a single collecting chamber 3, the chamber may be equipped with two spinning portions 5, as shown in FIG. 6. Spinner 1A is located in spinner portion 5A and spinner 1B is located in spinner portion 5B, and they are each directed into a single collecting portion 3. This portion can be divided, on the spinner side of the collecting screen, by inclined walls 80 which co-operate with the inclined walls 32 to provide an outwardly diverging collecting zone for each spinner.

Figure 5:
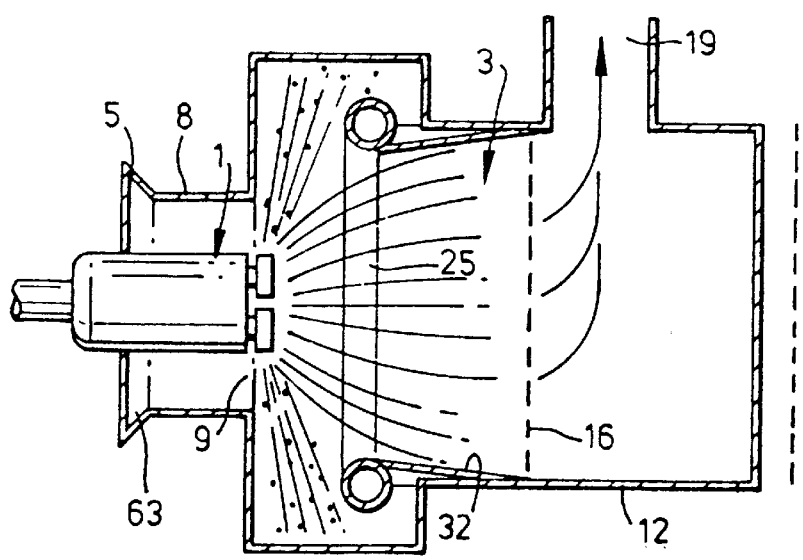
FIG. 5 is a view similar to FIG. 1 but of an apparatus having a shorter tubular duct.

In the spinner shown in FIG. 5, the tubular section 8 of the spinner portion is only about half the length of the spinner. It can be made even shorter, for instance about a quarter of the length of the spinner, especially if the flared portion 63 is increased in length and depth, so as to create a nozzle effect in the annular collar 9 between the tubular portion 8 and the spinner 1.

In a typical spinner of the type shown in WO92/06047 it is often convenient for the primary air to have a mean velocity of about 150 m/s and the air which flows around the spinner to have a mean axial velocity of around 5 m/s, and for the volume of primary air to be about 15,000 $Nm^3/h$ and the volume of induced air to be about 150,000 $Nm^3/h$. However in a typical process of the invention the mean velocity of the primary air may be about 100 m/s giving a volume of around 5,000 $Nm^3/h$ while the mean velocity of the induced air through the collar around the spinner may be about 25 m/s and may give a volume only of about 100,000 $Nm^3/h$.

In a spinner as described in WO92/06047 steady flow conditions may prevail in the primary air slot but would not prevail in the air flowing around the spinner housing, because of the irregular shape of it. However if that spinner was modified and the induced air was passed at the same quantitative velocity and volume but through a streamline annular passage similar to the passage 9 in FIG. 1 (in order to eliminate turbulence), while retaining the same front face of the spinner (so that the rotors occupy only a small portion of the air of the front face) the radial velocity profile might be as shown in FIG. 7A.

In this figure, point K corresponds to the centre of the primary air slot, point L corresponds to its outermost wall, point M corresponds to the outer edge of the housing 1 and point N corresponds to the inner surface of the tubular wall 8. The solid line represents the velocity of the air at the front face of the spinner housing, i.e., as the primary air emerges from the slot. The dashed line represents a typical velocity profile some distance in front of the slot. It will be seen that there is still a very steep velocity gradient and accordingly there is therefore a very strong tendency for turbulence to occur in front of the spinner quite close to the spinner rotors.

Figure 7B:
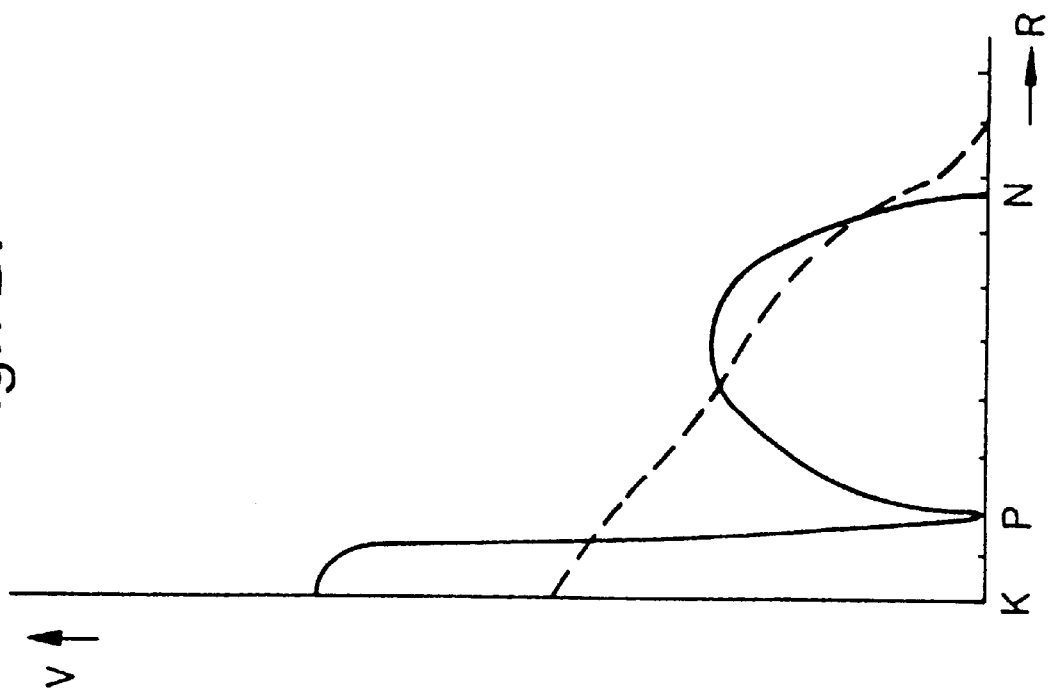
FIGS. 7A and 7B are two schematic diagrams of air velocity profiles where V is velocity and R is the radial distance from the centre of a primary air slot.
Figure 7A:
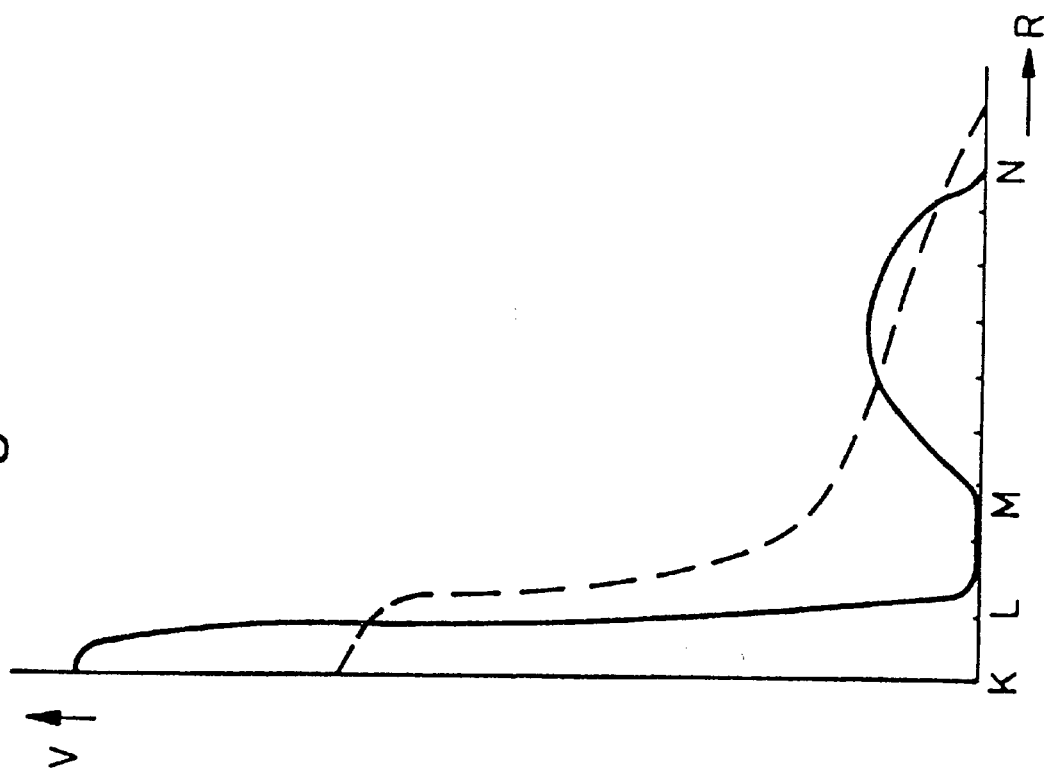

It must be remembered that, in practice, a conventional spinner will not give the air flows shown in FIG. 7A and, instead, the induced air between M and N is turbulent, further increasing the turbulence in front of the spinner.

In a typical process of the invention, the greater control of the process and the improved streamlining of the apparatus allows suitable air flows to be, typically, primary air flow of about 100 meters per second giving a volume of about 5,000 $Nm^3/h$ and an induced air flow of about 25 m/s giving a volume of about 100,000 $Nm^3/h$, where the induced air and the primary air are very close to one another. An idealised velocity profile of such air flows is shown diagrammatically in FIG. 7B where K and N represent the same points as in FIG. 7A but P represents the wall which defines the outside of the slot and the outside of the spinner housing. The solid line represents the air flows at the front face of the spinner and the dashed line represents the air flows in the collecting portion, in front of the spinner. It will be seen that the velocity gradient can be free of any region where the gradient is extremely steep, and thus there is very much less tendency for turbulence to occur.

EXAMPLE

Apparatus as shown in FIGS. 1 to 4 is used wherein

A=15°

B:C=6 rotor area=0.20 $m^2$ spinner cross section area=0.35 m²
duct cross section area=1.54 m²
rotor diameters 1, 2, 3, 4=185, 250, 310, 330 mm respectively
rotor acceleration fields=36, 49, 72, 89 km/s² respectively
primary air flow=4150 Nm³/h
induced air flow=90,000 Nm³/h
melt throughput=4500 kg/h
web density=250 g/m²
product quality—tensile strength of bonded product=10 to 12 kN/m² after 60% compression

We claim:

1. Apparatus for making MMVF products comprising
a centrifugal spinner (1) having a front end, a first rotatable rotor (43) or a set of rotatable rotors consisting of a first rotor (43) and one or more subsequent rotors (44, 45 and 46) wherein the or each rotor is mounted for rotation about a substantially horizontal axis in front of the front end whereby melt poured onto the first rotor is thrown off as fibres or, in a set of rotors, is thrown onto the or each subsequent rotor in sequence and is thrown off the or each subsequent rotor and optionally off the first rotor as fibres, and primary air supply means (53, 54, 55 and 56) at least in the outer peripheral regions of the spinner associated with the first rotor (43) or, in the set of rotors, with each subsequent rotor (44, 45 and 46) and optionally with the first rotor (43) for blasting primary air substantially axially forwards across the surface of the or each rotor with which the primary air supply means are associated, and motor means 50 for rotating the or each rotor,
and a chamber (2) which comprises a collecting portion (3) which has a spinner end (4) adjacent the centrifugal spinner (1) and which extends forwards from the spinner end (4),
characterised in that
the chamber also comprises a spinner portion (5) which has a rear end (6) which is substantially open to the atmosphere and a front end (7) which opens into and merges with the collecting portion (3), and a substantially tubular duct (8) which extends between the front end (7) and the rear end (6),
the collecting portion (3) of the chamber is substantially closed to the ingress of air except for air forced through the spinner (1) and air which is sucked through the tubular duct (8) and, optionally, a lesser, non-interfering, amount of air sucked or forced through supplementary air passages in the spinner end (13) of the collection portion (3),
the front end of the spinner (1) and the front end (7) of the spinner portion (5) together define a substantially open annular collar a between them,
at least 50% of the cross-sectional area of the front end (7) of the spinner portion is open to the flow of air sucked through the spinner portion by the suction means (19), and
the spinner (1) and the tubular duct (5) are constructed to provide substantially steady air flow conditions through the collar.

2. Apparatus according to claim 1 in which the spinner is a cascade spinner comprising a housing which is substantially closed to the free axial flow of air through the housing and which has a front face and a rear end and a substantially tubular wall which extends between the front face and the rear end, a first rotor and one or more subsequent rotors each mounted in the housing for rotation in front of the front face about a substantially horizontal axis and arranged such that melt poured on to the first rotor is thrown on to the or each subsequent rotor in turn and is thrown off the or each subsequent rotor (and optionally off the first rotor) as fibres, and primary air supply means associated with the or each subsequent rotor (and optionally with the first rotor) for blasting air substantially axially forward across the surface of the or each rotor at least in the outwardly facing regions of the or each rotor and motor means for driving the rotors and located within the housing or substantially within the area defined by the periphery of the rear end of the housing.

3. Apparatus according to claim 2 in which the total cross-sectional area of the first and subsequent rotor or rotors is 40 to 95% of the maximum cross-sectional area defined by the housing.

4. Apparatus according to claim 3 in which the total cross-sectional area of the first and subsequent rotors is 50 to 90% of the maximum cross-sectional area defined by the front 10 cm of the housing.

5. Apparatus according to claim 3 in which the housing has substantially parallel sides leading from the front face to a position at or near its rear end.

6. Apparatus according to claim 3 in which the total cross-sectional area of the first and subsequent rotors is 55 to 85% of the maximum cross-sectional area defined by the housing.

7. Apparatus according to claim 1 in which the motor means comprise a motor for each rotor substantially coaxial with that rotor.

8. Apparatus according to claim 7 including means for adjusting individually the speed of rotation of one or more of the rotors separately from one or more of the other rotors.

9. Apparatus according to claim 1 including secondary air supply means for blasting air axially forward for carrying fibres from the spinner towards the collector.

10. Apparatus according to claim 9 in which the secondary air supply means are in the spinner.

11. Apparatus according to claim 1 in which the spinner is mounted so that the vertical separation between the lowermost subsequent rotor and the lowermost part of the tubular duct of the spinner portion is at least 1.5 times the vertical separation between the top of the first rotor and the uppermost part of the tubular duct.

12. Apparatus according to claim 1 in which the spinner is suspended in the spinner portion from the sides and/or upper parts of the tubular duct.

13. Apparatus according to claim 1 in which there are means for oscillating the spinner relative to the spinner portion about a substantially vertical axis through an oscillation angle of 5 to 30°.

14. Apparatus according to claim 1 including means for oscillating the spinner with the spinner portion about a substantially vertical axis through an oscillation angle of 5 to 30°.

15. Apparatus according to claim 1 including means for pivoting the spinner about a substantially horizontal axis which is substantially parallel to the axes of rotation of the rotors.

16. Apparatus according to claim 1 including means for oscillating the spinner about a substantially horizontal axis which is substantially perpendicular to the axes of rotation of the rotors.

17. Apparatus according to claim 1 in which there are guides at or near the front end of the spinner portion each for imparting a non-axial movement to an axial segment of air flowing through the front end of the spinner portion into the collecting portion.

18. Apparatus according to claim 17 in which the guides are located on the inner face of the tubular wall and are shaped or adjustable to provide different non-axial movement to different axial segments of air flowing through the front end of the spinner portion.

19. Apparatus according to claim 17 in which the guides are positioned to provide an outward substantially conical component to air flowing from the front end of the spinner portion into the collecting portion.

20. Apparatus according to claim 1 in which the collecting portion of the chamber is substantially closed to the ingress of air except for air forced forward from the spinner and air sucked through the open area in the front end of the spinner portion.

21. Apparatus according to claim 1 in which there is a substantially parallel sided substantially annular passage defined between, externally, the substantially tubular duct of the spinner portion and, internally, the centrifugal spinner and this passage leads from the substantially open rear end to the collar.

22. Apparatus according to claim 1 in which the collector is positioned in the collecting chamber at an angle of 60° to 120° to the horizontal.

23. Apparatus according to claim 21 in which the horizontal distance from the bottom of the lowermost subsequent rotor to the collector is 0.3 W to W, where W is the maximum width of the open end of the spinner portion.

24. Apparatus according to claim 1 in which the collector has a width of 1.1 W to 2 W where W is the maximum width of the open end of the spinning portion.

25. Apparatus according to claim 1 in which the side walls of the collecting chamber, or air guide baffles within the side walls, diverge outwardly substantially conically from adjacent the open end of the spinner portion and the top wall of the collecting portion extends substantially conically upwardly from the open end of the spinner portion.

26. Apparatus according to any claim 1 including at least two of the said cascade spinners each positioned within its associated spinner portion, and wherein the spinner portions are arranged substantially parallel to one another and each opens into the spinner end of the collecting portion.

27. A first apparatus according to claim 1 comprising also at least one second apparatus according to any of claims 1 to 26 arranged in side-by-side relationship with the first apparatus.

28. A process for making MMVF products using apparatus according to any of claim 1 comprising pouring melt onto the first rotor while the rotor or rotors are spinning, forming fibres off the first or, in a set of rotors, off the or each subsequent rotor and optionally the first rotor while forcing primary air through the primary air supply means, and collecting the fibres as a web on the collector while applying suction through the collector and carrying the web out of the chamber on the collector, and sucking air through the collar under substantially steady flow conditions and with a mean axial velocity of 5 to 40% of the mean axial velocity of the primary air as it is forced out of the primary air supply means.

29. A process according to claim 28 in which the mean axial velocity of the air sucked through the open cross-sectional area is 5 to 50 m/s, and the axial velocity of the primary air as it is forced out of the air supply means is 60 to 170 m/s.

30. A process according to claim 28 in which the axial velocity of the primary air as it is forced out of the air supply means is 70 to 120 m/s, and the axial velocity of the air sucked through the open cross-sectional area is 10 to 30% of the axial velocity of the primary air as it is forced out of the air supply means and is from 10 to 35 m/s.

31. A process according to claim 28 in which the volume of air ($Nm^3/s$) forced through the spinner is below 8%, of the volume of air sucked through the open area.

32. A process according to claim 28 in which the steady flow conditions in the air through the collar and the supply of primary air are such that substantially non-turbulent conditions prevail in the region in the collecting chamber where the primary air initially merges with the air from the collar.

33. A cascade spinner (1) comprising a first rotor and one or more subsequent rotors (43, 44, 45, 46) each mounted for rotation in front of the front face (42) about a substantially horizontal axis and arranged such that melt poured onto the first rotor (43) is thrown onto each subsequent rotor in turn and is thrown off the subsequent rotors (and optionally off the first rotor) as fibres, and primary air supply means (53, 54, 55, 56) associated with the or each subsequent rotor (and optionally with the first rotor) for blasting air axially forward across the surface of the or each rotor at least in the outwardly facing region of the or each rotor, characterised in that the spinner includes a housing (40) which is substantially closed to the free axial flow of air through the housing and which has a front face (42), a rear end (41) and a substantially tubular wall (40) which extends between the front face and the rear end and which is substantially streamlined to air flowing axially along the outside of the housing, and motor means (50) for driving the rotors and located within the housing or substantially within the area defined by the periphery of the rear end of the housing, and in which the total cross-sectional area of the first and subsequent rotors (43, 44, 45, 46) is at least 40% of the maximum cross-sectional area defined by the tubular wall of the housing (40).

34. Apparatus according to claim 33 in which the total cross-sectional area of the first and subsequent rotors is 50 to 90% of the maximum cross-sectional area defined by the front 10 cm of the housing.

35. Apparatus according to claim 33 in which the housing has substantially parallel sides leading from the front face to at or near its rear end.

36. Apparatus according to claim 33 in which the total cross-sectional area of the first and subsequent rotors is 55 to 85% of the maximum cross-sectional area defined by the housing.

37. Apparatus according to claim 33 in which the motor means comprise a motor for each rotor coaxial with that rotor.

38. Apparatus according to claim 33 additionally comprising a substantially tubular duct that surrounds the housing to define an open area around the housing and which is open at its front end and at its rear end.

39. Apparatus according to claim 38 including means for oscillating the spinner relative to the tubular duct about a substantially vertical axis or about a substantially horizontal axis.

40. Apparatus according to claim 38 in which the spinner is suspended within the duct.

41. Apparatus according to claim 38 in which the open area around the housing is 50 to 95% of the cross-sectional area of the front end of the tubular duct.

* * * * *

UNITED STATES PATENT AND TRADEMARK OFFICE
CERTIFICATE OF CORRECTION

PATENT NO. : 5,906,669
DATED : May 25, 2000
INVENTOR(S) : Tonder et al.

It is certified that error appears in the above-identified patent and that said Letters Patent is hereby corrected as shown below:

<u>Title page, item [57]</u>
Read -- MMVF products are made by a novel process which uses novel apparatus comprising a centrifugal spinner (1), a chamber (2) which comprises a collecting portion (3) which has a spinner end (4) adjacent to the centrifugal spinner (1) and which extends forward from the spinner end and which comprises side and top walls (12, 14) an upwardly inclined base defined by collector (16), wherin the chamber also comprises a spinner portion (5) which has a rear end (6) which is substantially open to the atmosphere and a front end (7) which opens and merges with the collecting portion (3), and a substantially tubular duct (8) which extends between the front end (7) and the rear end (6), the collecting portion (3) of the chamber is substantially closed to the ingress of air which is sucked through the tubular duct (8) and optionally, a lesser, non-interfering, amount of the air is sucked or forced supplementary air passages in the spinner end (13) of the collecting portion (3), the front end of the spinner (1) and the front end (7) of the spinner portion (5) together define a substantially open annular collar between them, at least 50% of the cross-sectional area of the front end (7) of the spinner portion is open to flow of air sucked through the spinner portions by the suction means (19), and the spinner (1) and the tubular duct (5), are constructed to provide substantially steady air flow conditions through the collar. The invention includes a novel spinner which can be used in the apparatus. --

Signed and Sealed this

Twenty-eighth Day of August, 2001

Attest:

*Nicholas P. Godici*

*Attesting Officer*

NICHOLAS P. GODICI
*Acting Director of the United States Patent and Trademark Office*